US011029880B2

(12) United States Patent
Vedpathak et al.

(10) Patent No.: US 11,029,880 B2
(45) Date of Patent: Jun. 8, 2021

(54) PROCESSING DATA ACCESS REQUESTS IN ACCORDANCE WITH A STORAGE UNIT MEMORY PRESSURE LEVEL

(71) Applicant: International Business Machines Corporation, Armonk, NY (US)

(72) Inventors: Yogesh R. Vedpathak, Chicago, IL (US); Brian S. Farrell, Chicago, IL (US); Mingyu Li, Chicago, IL (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 136 days.

(21) Appl. No.: 16/290,503

(22) Filed: Mar. 1, 2019

(65) Prior Publication Data
US 2020/0278812 A1 Sep. 3, 2020

(51) Int. Cl.
*G06F 3/06* (2006.01)
*G06F 11/10* (2006.01)

(52) U.S. Cl.
CPC .......... *G06F 3/0659* (2013.01); *G06F 3/067* (2013.01); *G06F 3/0613* (2013.01); *G06F 11/1076* (2013.01)

(58) Field of Classification Search
None
See application file for complete search history.

(56) References Cited

U.S. PATENT DOCUMENTS

| 6,771,596 B1 | 8/2004 | Angle et al. | |
|---|---|---|---|
| 7,715,419 B2 | 5/2010 | Tatar et al. | |
| 2006/0277373 A1* | 12/2006 | Pohl | G06F 9/485 711/151 |
| 2010/0076805 A1* | 3/2010 | Batsakis | G06Q 40/00 705/35 |

(Continued)

OTHER PUBLICATIONS

Anonymous; Combining Multiple Intent Operations into a Single Write; ip.com; IP.com No. IPCOM000248630D; Dec. 22, 2016; 2 pgs.

(Continued)

*Primary Examiner* — Michael Alsip
(74) *Attorney, Agent, or Firm* — James Nock; Andrew D. Wright; Roberts Calderon Safran & Cole, P.C.

(57) ABSTRACT

A method includes determining, by a storage unit of a dispersed storage network (DSN), a storage unit memory pressure level. When the storage unit memory pressure level compares unfavorably to a threshold, the method further includes, in response to a data access request regarding an encoded data slice from a computing device, determining whether the data access request includes an override message or a non-override message. When the data access request includes the non-override message, the method includes generating a storage unit memory pressure level message in accordance with the storage unit memory pressure level and the type of data access request, sending the storage unit memory pressure level message to the computing device, and processing the data access request in accordance with the storage unit memory pressure level message.

(Continued)

When the data access request includes the override message, the method further includes processing the data access request.

12 Claims, 17 Drawing Sheets

(56) References Cited

U.S. PATENT DOCUMENTS

| | | | |
|---|---|---|---|
| 2013/0145077 A1* | 6/2013 | Huang | G06F 11/008 711/103 |
| 2017/0109299 A1 | 4/2017 | Belair et al. | |
| 2017/0374177 A1* | 12/2017 | Chrysanthakopoulos | G06F 9/541 |
| 2019/0303281 A1* | 10/2019 | Firoozshahian | H04L 47/12 |

OTHER PUBLICATIONS

Anonymous; Enabling Identity Usage Tracking within DSN Memory; ip.com; Ip.com No. IPCOM000249458D; Feb. 27, 2017; 3 pgs.

Anonymous; Method and System for Dynamic Translation and Language Tracking in a Data Source Name (DSN) Memory; ip.com; IP.com No. IPCOM000248631D; Dec. 22, 2016; 3 pgs.

Anonymous; Providing Efficient Legal Event Source Data Retention within DSN Memory; ip.com; IP.com No. IPCOM000253894D; 3 pgs; May 15, 2018.

Carloni; The Role of Back-Pressure in Implementing Latency-Insensitive Systems; Electronic Notes in Theoretical Computer Science; 2006; vol. 146; pp. 61-80.

Sridharan, et al.; Implementing Backpressure-based Rate Control in Wireless Networks; IEEE 2009 Information Theory and Applications Workshop; pp. 341-345; Feb. 8-13, 2009.

* cited by examiner distributed, or dispersed, storage network (DSN) 10

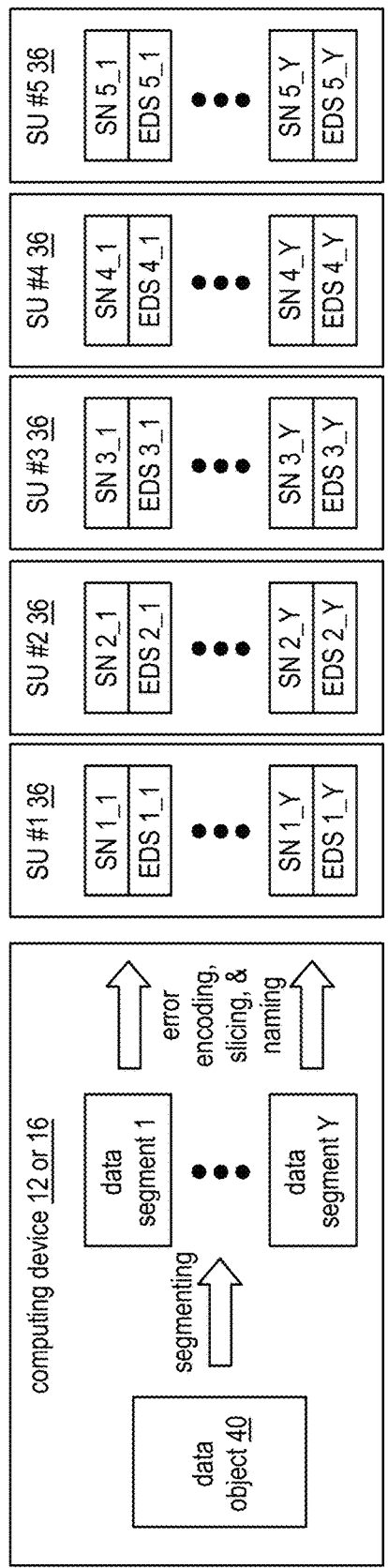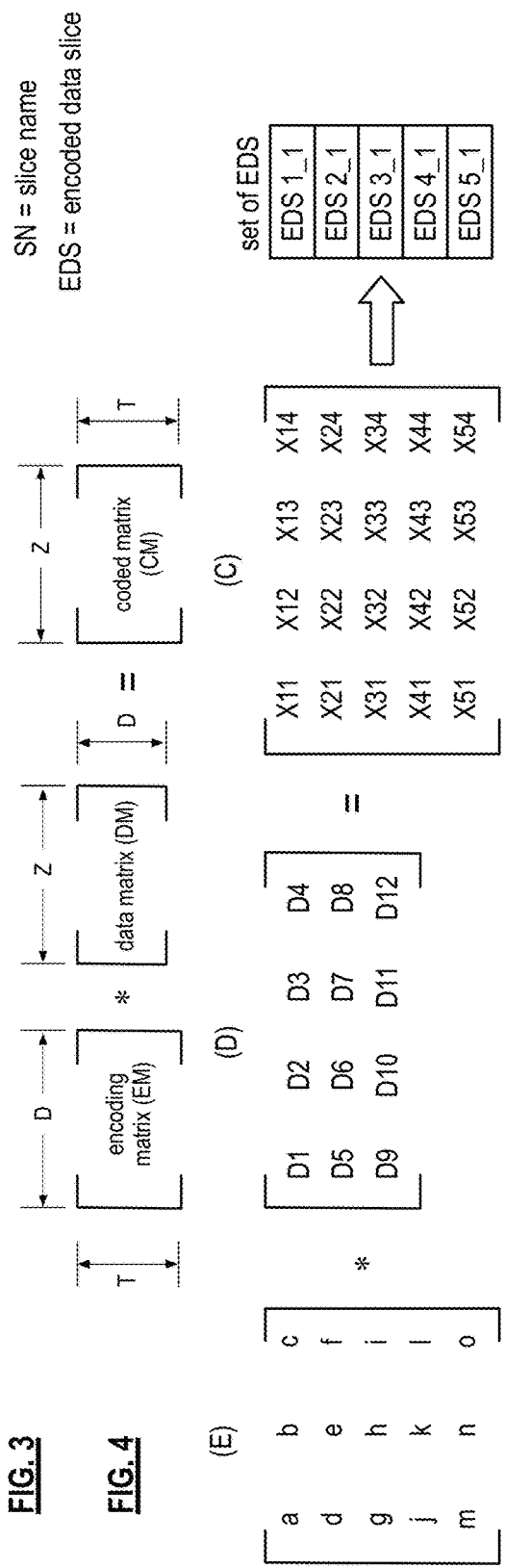

SN = slice name
EDS = encoded data slice

| transaction # | SN | EDS | current rev. | new rev. | write request 96, 100, or 102

FIG. 10 write requests 96
for a set of EDS 98 write request 96-1

| 0413 | SN 1_1 | EDS A_1_1 | 003 | 004 |

• • • write request 96-5

| 0413 | SN 5_1 | EDS A_5_1 | 003 | 004 | write requests 100
for a set of EDS 98 write request 100-1

| 0279 | SN 1_1 | EDS B_1_1 | 003 | 004 |

• • • write request 100-5

| 0279 | SN 5_1 | EDS B_5_1 | 003 | 004 | write requests 102
for a set of EDS 98 write request 102-1

| 0500 | SN 1_1 | EDS C_1_1 | 003 | 004 |

• • • write request 102-5

| 0500 | SN 5_1 | EDS C_5_1 | 003 | 004 |

FIG. 11

PROCESSING DATA ACCESS REQUESTS IN ACCORDANCE WITH A STORAGE UNIT MEMORY PRESSURE LEVEL

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Distributed storage systems are known to utilize a three-phase process for writing consistently in a dispersed storage network (DSN) memory, where the three phases include: (1) A write phase; (2) A commit phase; and (3) A finalize phase. The three phases address consistency issues that may arise from different storage units of the DSN holding different revisions of encoded data slices, where data is dispersed storage error encoded to produce the encoded data slices. The three phases are known to utilize a threshold approach to advance the writing process to the next phase or to reverse the process when conflicts and errors arise to maintain consistency of revision storage. Losing contests or unresolved contests as a result of overlapping write requests can remain in storage unit memory for a long time and cause storage unit memory pressure.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 10 is a schematic block diagram of an example of a write request in accordance with the present invention;

FIG. 11 is a schematic block diagram of another example of overlapping write requests in accordance with the present invention;

DETAILED DESCRIPTION OF THE INVENTION

Figure 1:
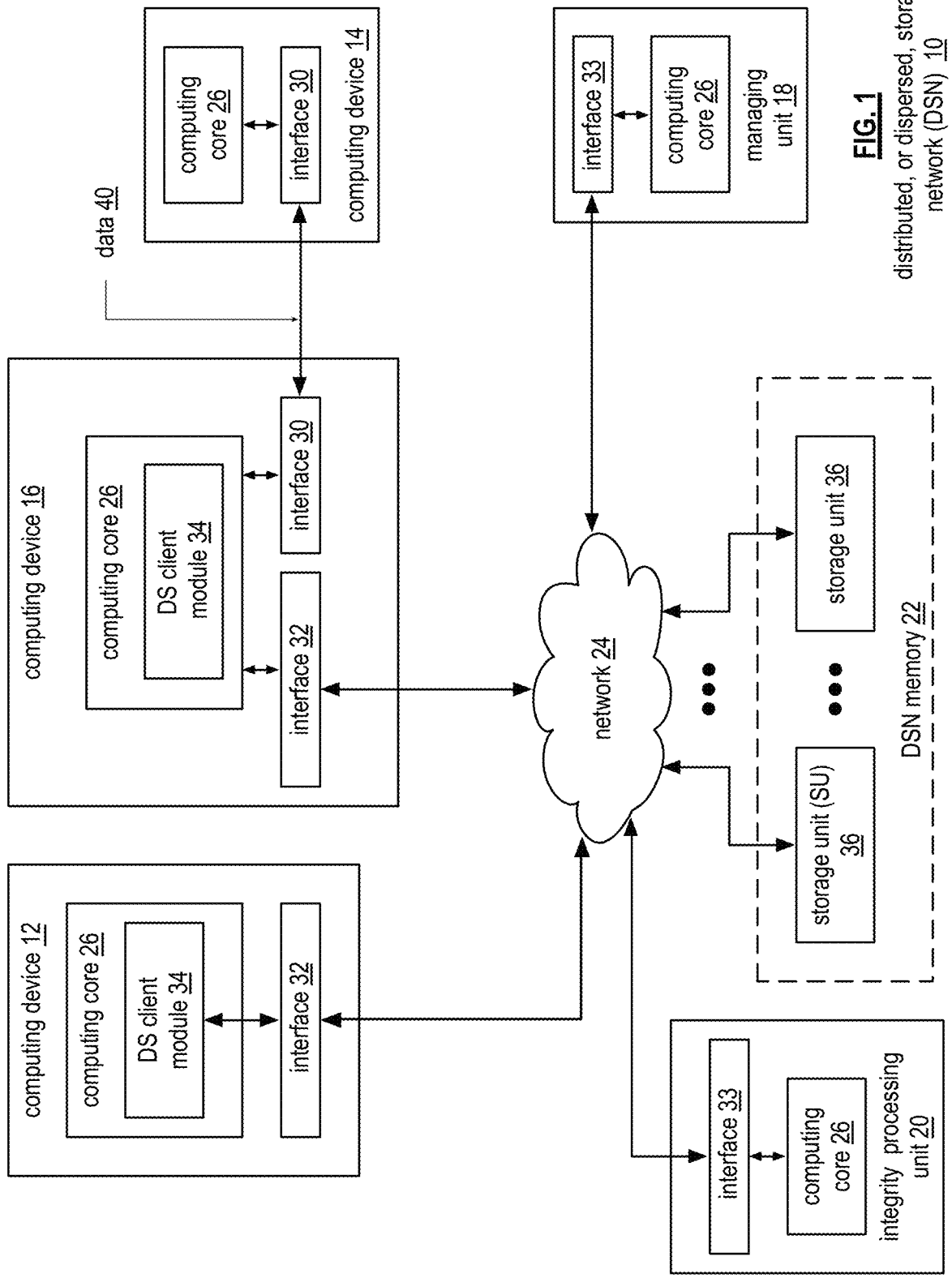
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
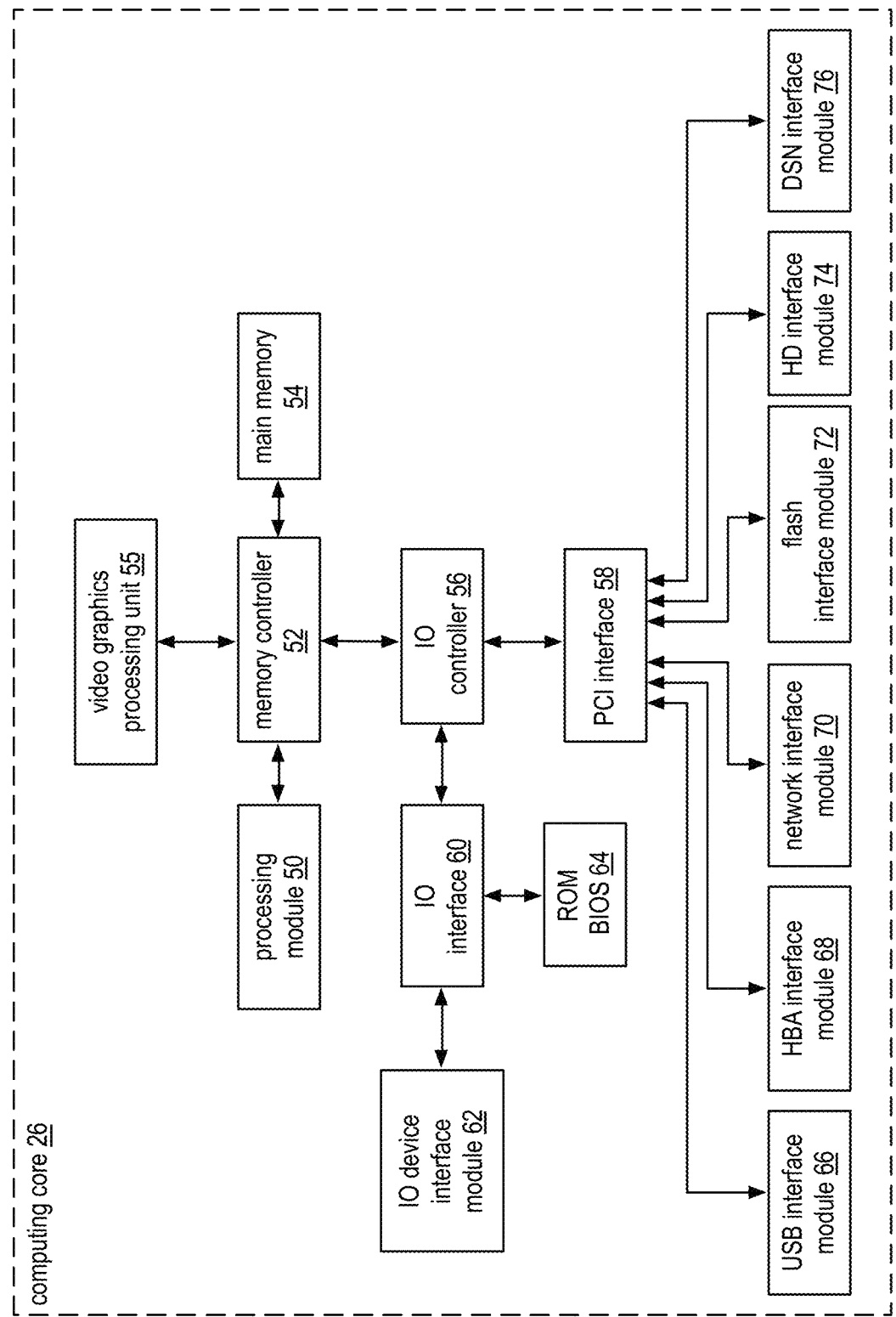
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
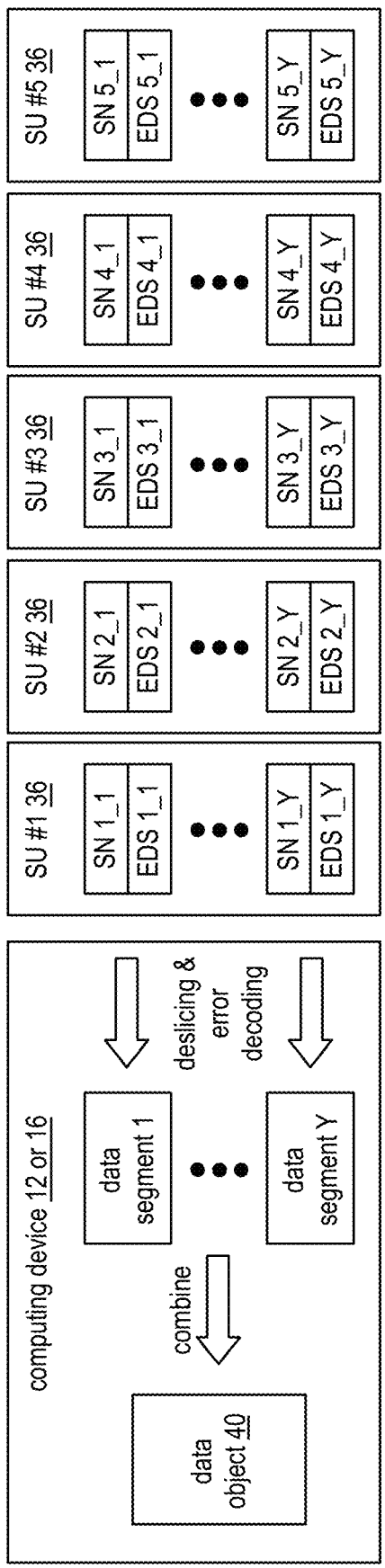
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
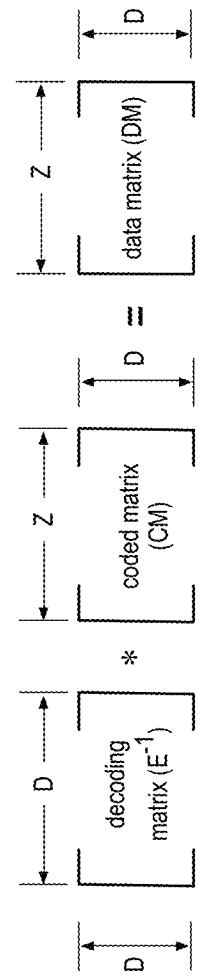
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
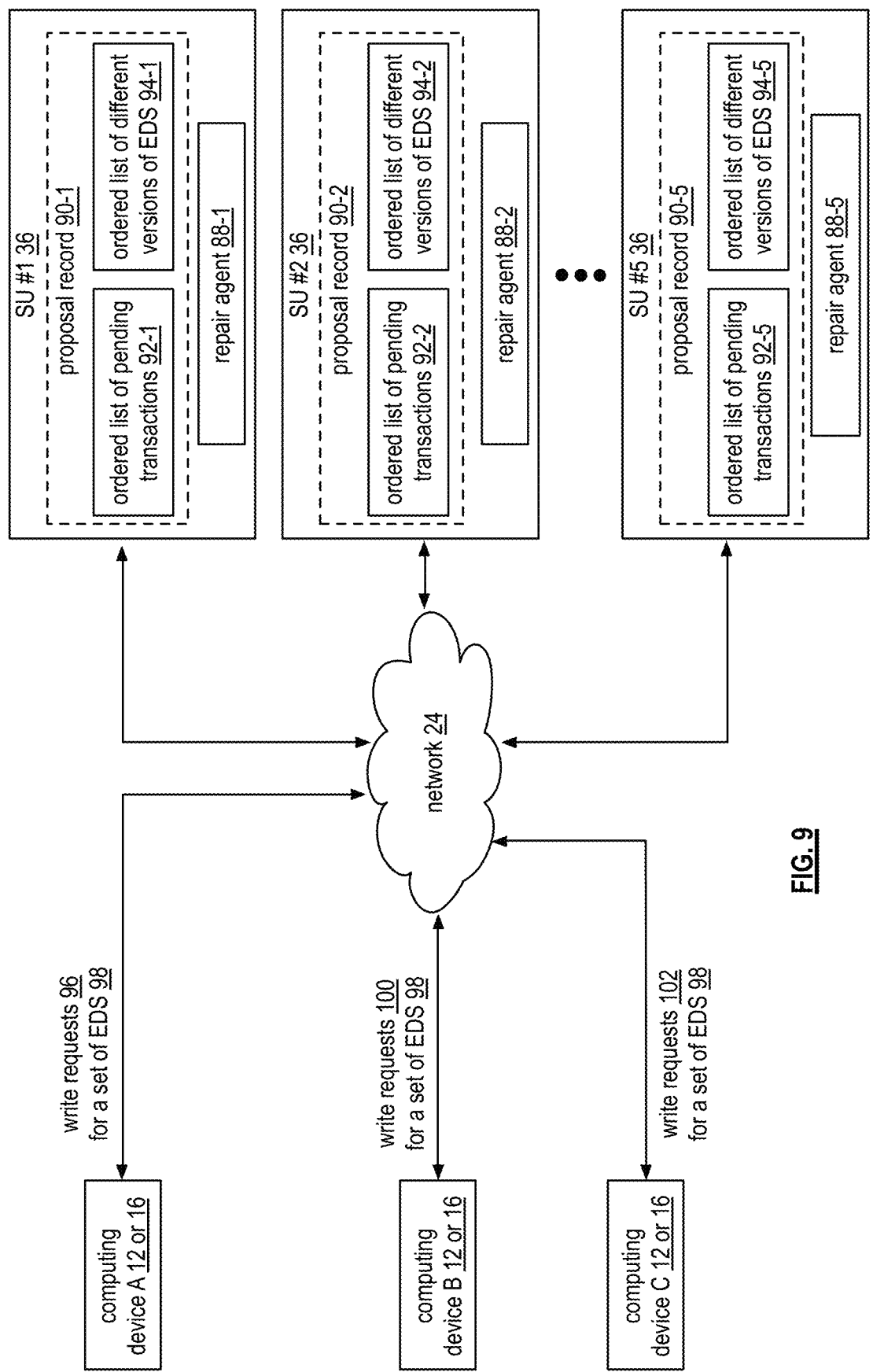
FIG. 9 is a schematic block diagram of an embodiment of the dispersed or distributed storage network (DSN) in accordance with the present invention.

FIG. 9 is a schematic block diagram of an embodiment of the dispersed or distributed storage network (DSN) that includes computing devices A-C (e.g., computing devices 12 or 16 of FIG. 1), network 24, and a set of storage units (SUs) 36 #1-#5. SUs #1-#5 include proposal records 90-1 through 90-5 for an encoded data slice and repair agents 88-1 through 88-5. Although shown as a part of each storage unit, repair agents 88-1 through 88-5 may be separate devices or part of another device of the DSN. Repair agents 88-1 through 88-5 remove erroneous or unnecessary data from SUs #1-#5 and facilitate closing out and/or processing data access requests for SUs #1-#5. A data access request includes one or more of a write request, a write commit, a write finalize, a read request, a cleanup request, a delete request, a list request, and an edit request.

FIG. 9 depicts an example of overlapping write requests for a set of encoded data slices having the same set of slice names. Overlapping write requests occur when one set of write requests is pending (e.g., write finalize requests have not yet been issued) and another set of write requests for a set of encoded data slices having the same set of slice names is received by the storage units. Sets of encoded data slices have the same set of slice names when they are regarding the same data source. In this example, computing devices A, B, and C send overlapping write requests 96, 100, and 102 regarding a set of encoded data slices 98 with the same set of slices names.

To process overlapping write requests (and other overlapping data access requests), each storage unit 36 (SU#1-SU#5) stores its own proposal record 90-1 through 90-5 for a slice name or for a group of slice names (e.g., an encoded data slice of a data source has its own proposal records). A proposal record 90 includes an order listed of pending transactions 92 and an ordered list of visible and different versions of an encoded data slice (EDS) 94 having the same slice name. The proposal record 90 may further include an indication of the current revision level of the encoded data slice.

The ordered list of pending transactions 92 include a time ordered list of transaction numbers, or other indication, associated with data access requests regarding the slice name that were received while the proposal record is open (e.g., write finalize commands have not yet been issued for one of the pending write requests). For example, the proposal record 90-1 of storage unit #1 includes an ordered list of transaction numbers for data access requests regarding a first slice name of a set of slice names.

As a specific example, a first write request from computing device A regarding a version of an encoded data slice having the first slice name has a first transaction number (e.g., 0413), a second write request from computing device B regarding another version of the encoded data slice having the first slice name has a second transaction number (e.g., 0279), and a third write request from computing device C regarding another version of the encoded data slice having the first slice name has a third transaction number (e.g., 0500). Storage unit #1 received the first write request before receiving the second write request and received the second write request before receiving the third write request. As such the proposal record 90-1 has the first write request (e.g., the first transaction number) in a first priority position, the second write request in a second priority position, and the third write request in a third priority position.

As another specific example, a write request from computing device A regarding a version of an encoded data slice having a second slice name has the first transaction number (e.g., 0413), a write request from computing device B regarding another version of the encoded data slice having the second slice name has the second transaction number (e.g., 0279), and a write request from computing device C regarding another version of the encoded data slice having the second slice name has the third transaction number (e.g., 0500). Storage unit #2 received the write request from computing device B before receiving the write request from computing device A and received the write request from computing device A before receiving the write request from computing device C. As such, the proposal record 90-2 has the write request of computing device B (e.g., the second transaction number) in the first priority position, the write request from computing device A in a second priority position, and the write request from computing device C in a third priority position.

As another specific example, a write request from computing device A regarding a version of an encoded data slice having a third slice name has the first transaction number (e.g., 0413), a write request from computing device B regarding another version of the encoded data slice having the third slice name has the second transaction number (e.g., 0279), and a write request from computing device C regarding another version of the encoded data slice having the third slice name has the third transaction number (e.g., 0500). Storage unit #3 received the write request from computing device C before receiving the write request from computing device A and received the write request from computing device A before receiving the write request from computing device B. As such, the proposal record 90-3 has the write request of computing device C (e.g., the third transaction number) in the first priority position, the write request from computing device A in a second priority position, and the write request from computing device B in a third priority position. The remaining storage units generate their respective proposal records in a similar manner.

In general, a storage unit "opens" a proposal record when it receives a new write request for a version of an encoded data slice having a slice name (i.e., no other write requests are pending). The storage unit sends the proposal record to the computing device sending the write request. If there are no overlapping write requests for a set of encoded data slices having a set of slice names, then the other storage units (SU #2-SU#5) open up proposal records and send them to the computing device.

The computing device interprets the proposal records to determine whether a threshold number, or more, (e.g., decode threshold number, write threshold number, etc.) of its write requests is in the first priority position. When there is not an overlapping write request, the write requests will be in the first priority position. As such, the computing device sends finalize requests to the storage units. The storage units process the finalize request to make the new version of the encoded data slices as the most recent set of encoded data slices and close their respective proposal records.

When there is an overlapping write request (e.g., a storage unit has an open proposal record for the slice name), the storage unit updates the proposal record with the new write request by placing the new write request is a lower priority position than previously received and pending write requests. After updating the proposal record, the storage unit sends the proposal record to the computing device that sent the new write request.

As the computing devices receive the proposal records, it determines whether at least the threshold number of their respective write requests are in first priority position. If yes, the computing device issues the finalize commands. If not, the computing device withdraws its write requests or executes some other fallback position. In addition to withdrawing its write request, the computing device sends cleanup requests to remove the contest information from the storage units. If the computing device does not send a cleanup request (e.g., the computing device crashes, etc.) or the storage unit does not receive a cleanup request (e.g., the storage unit crashes, the cleanup request is dropped because of network contention, etc.) the contest may be left open indefinitely (i.e., become abandoned).

To remove abandoned contests from memory, when a computing device sends a write finalize request, the storage unit removes other losing contests from memory. Alternatively, a storage unit may use repair agent 88 to locate and remove abandoned contests. Abandoned contests are held in the memory of the storage unit and, if active for a long time, may cause memory pressure. Memory pressure could lead to degraded performance or a process crash. Therefore, to prevent memory pressure, the storage units keep track of how many active contests are stored in memory and, if experiencing memory pressure, may reject new active contests until storage unit memory pressure is reduced (i.e., abandoned contests are removed).

FIG. 10 is a schematic block diagram of an example of a write request 96, 100, and 102 of FIG. 9. The write request includes a transaction number field, a slice name (SN) field, an encoded data slice (EDS) field, a current revision level field, and a new revision level field. Each write request in the set of write requests includes the same transaction number, a different slice name, a different EDS, the same current revision level, and the same new revision level.

FIG. 11 is a schematic block diagram of another example of overlapping write requests 96, 100, and 102 for a set of encoded data slices 98. In this example, each of computing device A, B, and C encoded the same data segment into a different set of five encoded data slices. Accordingly, each of computing devices A, B, and C generates five write requests 96-1 through 96-5, 100-1 through 100-5, and 102-1 through 102-5. The write requests from computing device A include the same transaction number of 0413 (which may be randomly generated, may be a time stamp, etc.), differing slice names (SN 1_1 through SN 5_1), differing encoded data slices (EDS A_1_1 through EDS A_5_1), the same current revision level of 003, and the next revision level of 004.

The write requests from computing device B include the same transaction number of 0279, differing slice names (SN 1_1 through SN 5_1), differing encoded data slices (EDS B_1_1 through EDS B_5_1), the same current revision level of 003, and the next revision level of 004.

The write requests from computing device C include the same transaction number of 0500, differing slice names (SN 1_1 through SN 5_1), differing encoded data slices (EDS C_1_1 through EDS C_5_1), the same current revision level of 003, and the next revision level of 004. A comparison of the write requests from computing device A with the write requests from computing device B and computing device C yields that the write requests have the same slice names, the same current revision levels, and the same next revision levels. The write requests differ in the transaction numbers and in the encoded data slices.

Figure 12A:
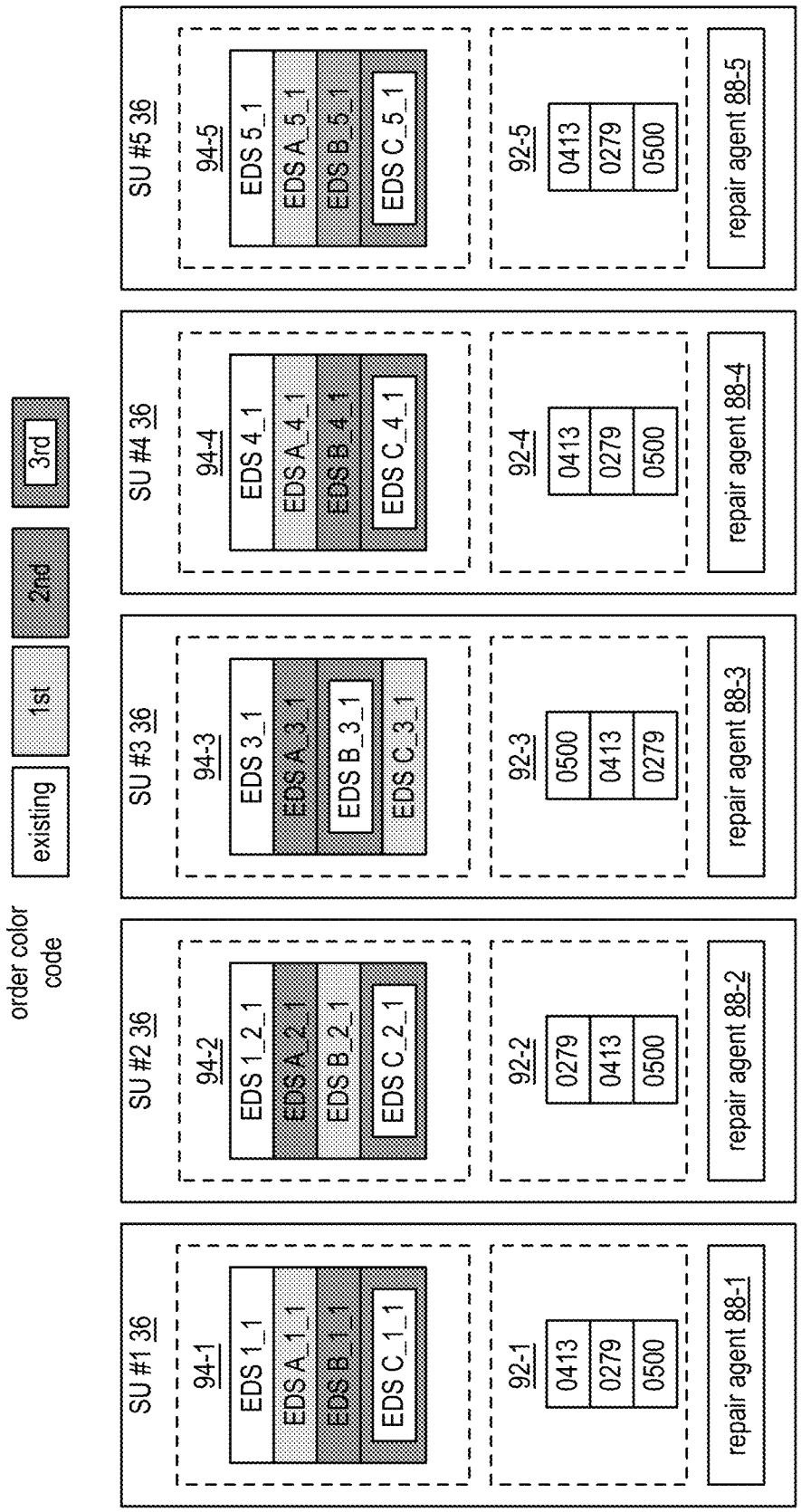
FIGS. 12A-12D are schematic block diagrams of an example of proposal records for a set of encoded data slices stored by storage units of the DSN in accordance with the present invention.

FIGS. 12A-12D are schematic block diagrams of an example of proposal records for a set of encoded data slices stored by storage units of the DSN. As shown in FIG. 12A, while the write requests 96, 100, and 102 are sent out at similar times, due to differing latencies and/or processing capabilities between the computing devices and storage units, the requests are received at different times and, potentially in a different order, by the storage units than the order in which they were transmitted.

Prior to the reception of the write requests, the storage units store a current revision level of the set of encoded data slices. As shown in FIG. 12A, storage unit SU#1 stores EDS 1_1, storage unit SU#2 stores EDS 2_1, and so on. In this example, the current revision level of the encoded data slices is 003.

Figure 12B:
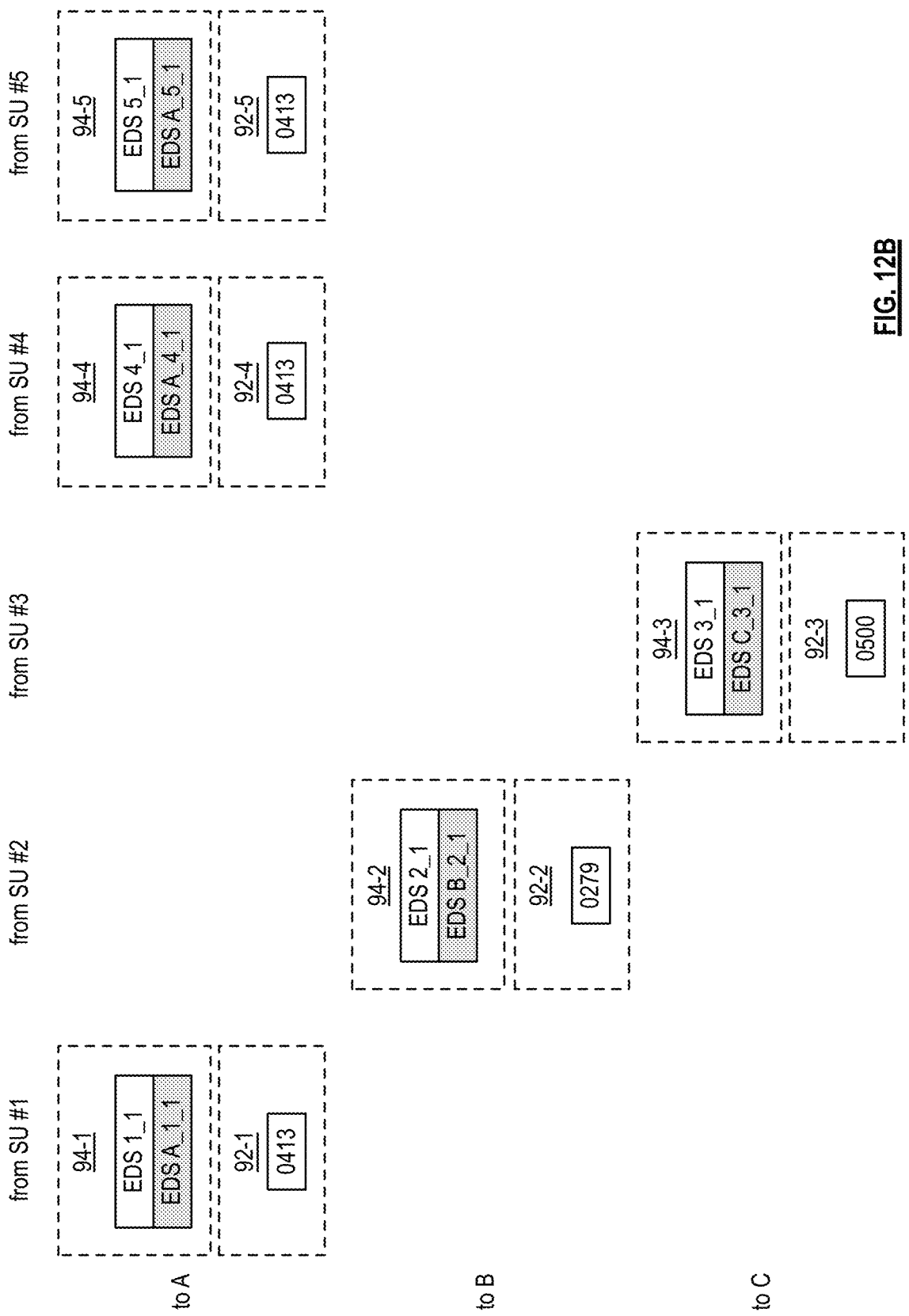
Figure 12C:
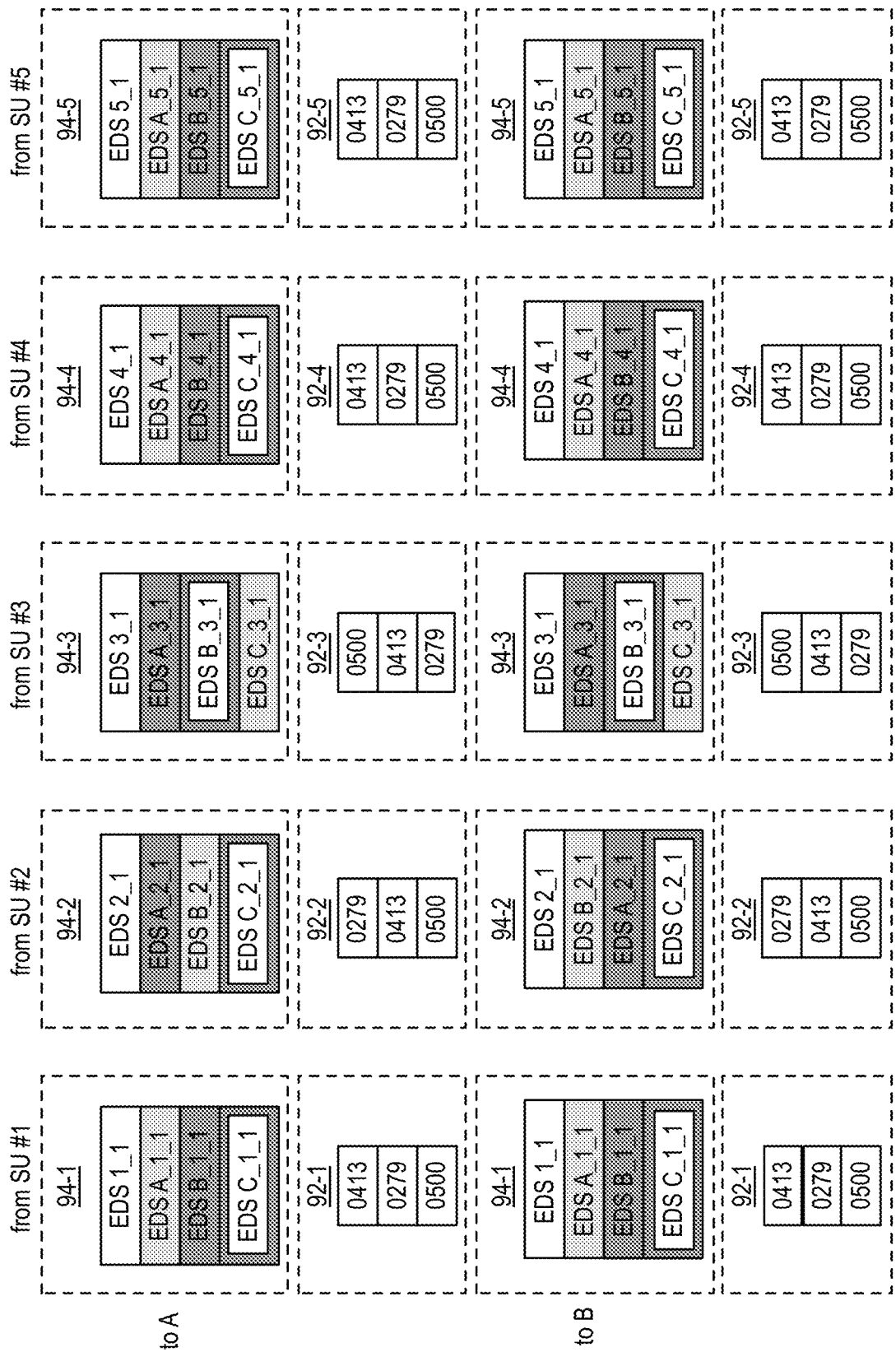
Figure 12D:
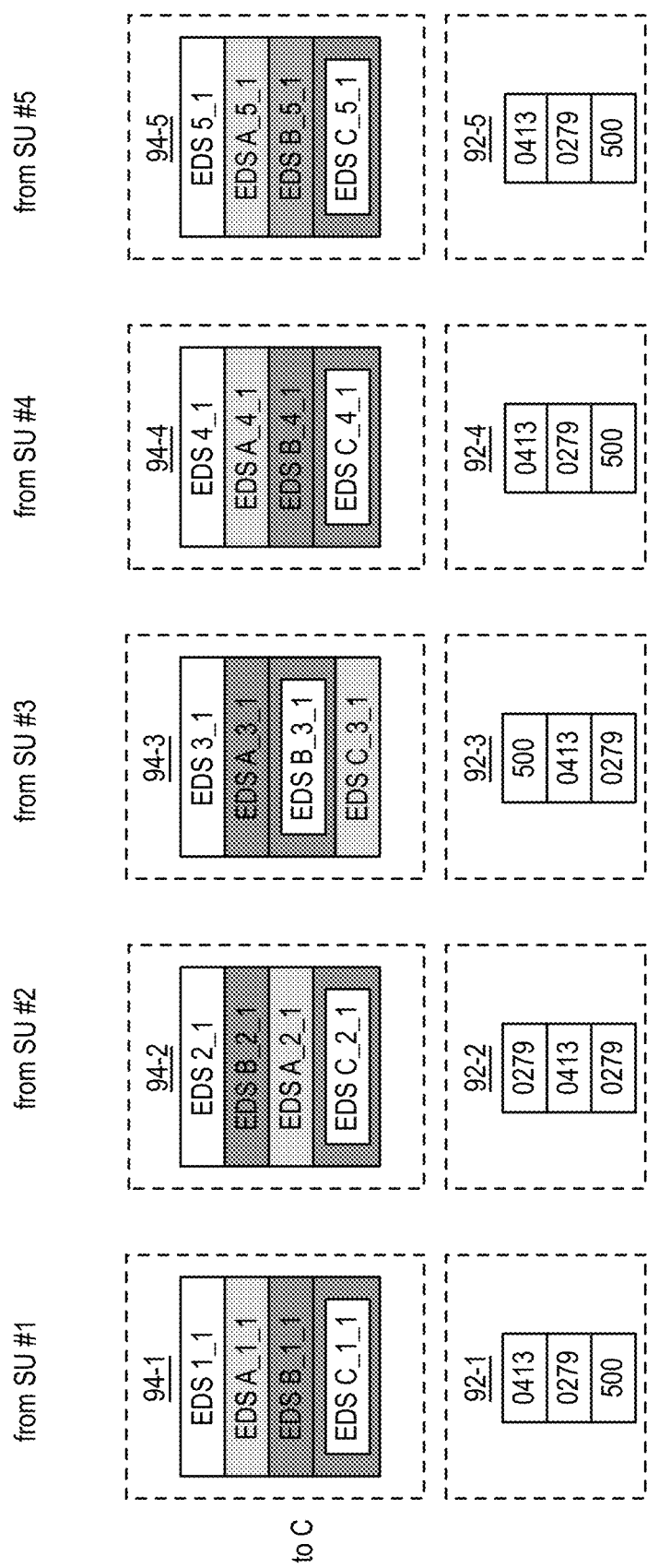

In this example, when a storage unit receives a data access request, it opens a proposal record that identifies the data access it just received, the current revision level, and an indication that the current revision level of the encoded data slice is visible (e.g., can be accessed by a computing device of the DSN). Upon opening a proposal record, the storage unit sends it to the computing device from which it received the request. For example, FIG. 12B shows the first proposal records sent to computing device A, computing device B, and computing device C. FIG. 12C shows updated proposal records sent to computing devices A and B. FIG. 12D shows updated proposal records sent to computing device C.

For example, each of storage units 1, 4, and 5 received the write request from computing device A first. Accordingly, each storage unit creates a proposal record that includes the ordered list of pending transactions 92 and the order list of visible different versions of EDS 94, which is sent to computing device A. As shown in FIG. 12B, each of the ordered list of pending transactions 92-1, 92-4, and 92-5 include the transaction number of 0413 (the transaction number for the write requests of computing device A) in the first priority position. Further, each of the order list of visible different versions of EDS 94-1, 94-4, and 94-5 includes an indication that the current revision level of the encoded data slice and the encoded data slice from computing device A are visible (e.g., for SU #1, EDS 1_1 and EDS A_1_1 are visible).

Continuing with the example, storage unit #2 receives the write request from computing device B first. Accordingly, storage unit #2 creates a proposal record that includes the ordered list of pending transactions 92-2 and the order list of visible different versions of EDS 94-2, which is sent to computing device B. As shown in FIG. 12B, the ordered list of pending transactions 92-2 includes the transaction number of 0279 (the transaction number for the write requests of computing device B) in the first priority position. Further, the ordered list of visible different versions of EDS 94-2 includes an indication that the current revision level of the encoded data slice and the encoded data slice from computing device B are visible (e.g., EDS 2_1 and EDS B_2_1 are visible).

Continuing with the example, storage unit #3 receives the write request from computing device C first. Accordingly, storage unit #3 creates a proposal record that includes the ordered list of pending transactions 92-3 and the order list of visible different versions of EDS 94-3, which is sent to computing device C. As shown in FIG. 12B, the ordered list of pending transactions 92-3 includes the transaction number of 0500 (the transaction number for the write requests of computing device C) in the first priority position. Further, the ordered list of visible different versions of EDS 94-3 includes an indication that the current revision level of the encoded data slice and the encoded data slice from computing device C are visible (e.g., EDS 3_1 and EDS C_3_1 are visible).

As shown in FIG. 12A, after receiving the write requests from computing device A, storage units 1, 4, and 5 receive the write request from computing device B, and then receive the write request from computing device C. Accordingly, each storage unit updates its proposal record, which are sent to computing devices A, B, and C. As shown in FIGS. 12C and 12D, each of the ordered list of pending transactions 92-1, 92-4, and 92-5 are updated to include the transaction number of 0279 (the transaction number for the write requests of computing device B) in the second priority position, and the transaction number of 0500 (the transaction number for the write requests of computing device C) in the third priority position. Further, each of the order list of visible different versions of EDS 94-1, 94-4, and 94-5 are updated to include an indication that the current revision level of the encoded data slice and the encoded data slices from computing devices A, B, and C are visible (e.g., for SU #1, EDS 1_1 EDS A_1_1, EDS B_1_1, and C_1_1 are visible).

After receiving the write requests from computing device B, storage unit 2 receives the write request from computing device A, and then receives the write request from computing device C. Accordingly, storage unit #2 updates its proposal record, which is sent to computing devices A, B, and C. For example, as shown in FIGS. 12C and 12D, the ordered list of pending transactions 92-2 from SU#2 now includes the transaction number of 0413 (the transaction number for the write requests of computing device A) in the second priority position, and the transaction number of 0500 (the transaction number for the write requests of computing device C) in the third priority position. Further, the ordered list of visible different versions of EDS 94-2 includes an indication that the current revision level of the encoded data slice and the encoded data slices from computing devices A, B, and C are visible (e.g., EDS 2_1, EDS B_2_1, EDS A_2_1, and EDS C_2_1 are visible).

After receiving the write requests from computing device C, storage unit 3 receives the write request from computing device A, and then receives the write request from computing device B. Accordingly, storage unit #3 updates its proposal record, which is sent to computing devices A, B, and C. For example, as shown in FIG. 12D, the ordered list of pending transactions 92-3 from SU#3 now includes the transaction number of 0413 (the transaction number for the write requests of computing device A) in the second priority position, and the transaction number of 0279 (the transaction number for the write requests of computing device B) in the third priority position. Further, the order list of visible different versions of EDS 94-3 includes an indication that the current revision level of the encoded data slice and the encoded data slices from computing devices A, B, and C are visible (e.g., EDS 3_1, EDS C_3_1, EDS A_3_1, and EDS B_3_1 are visible).

Based on the updated proposal records received by computing devices A, B, and C, each computing device analyzes the proposal records to determine whether a threshold number of encoded data slices of a desired version of the set of encoded data slices are visible and of priority. If so, the computing device completes the write function (e.g., sends a write finalize request to the storage units). If not, the computing device issues a cleanup request to remove the contest information from the storage units' memory. In this example, computing device A has received three proposal records indicating its desired version of the set of encoded data slices are visible (e.g., A_1_1, A_4_1, and A_5_1) and of priority (e.g., 0413 is listed first in the transaction section). In this example, three is the threshold number required to perform a write. Therefore, computing device A can complete the write function. Computing device B and C do not have a threshold number and lose the contest.

Figure 13:
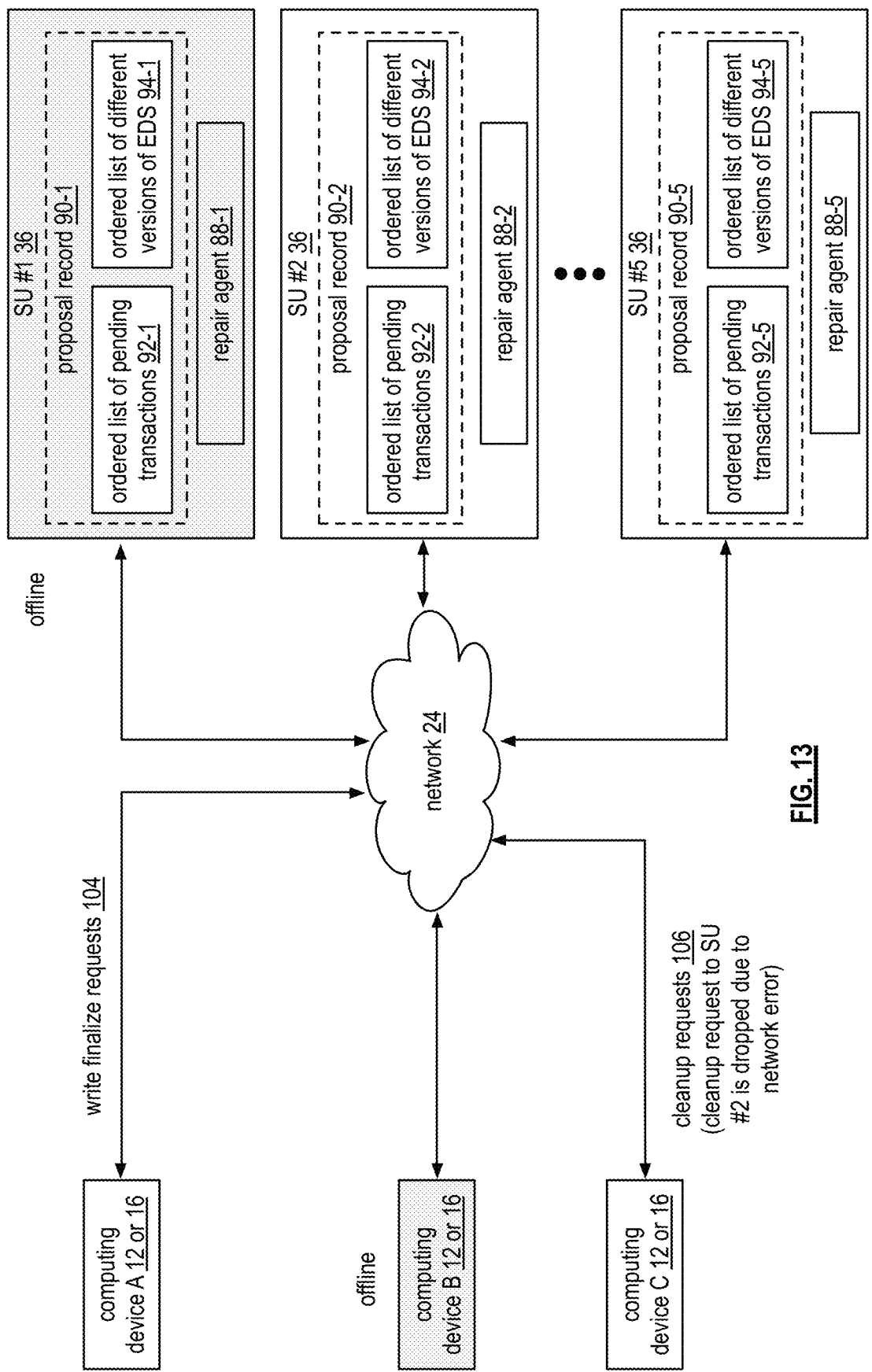
FIG. 13 is a schematic block diagram of another embodiment of the dispersed or distributed storage network (DSN) in accordance with the present invention.

FIG. 13 is a schematic block diagram of another embodiment of the dispersed or distributed storage network (DSN) that includes computing devices A-C (e.g., computing devices 12 or 16 of FIG. 1), network 24, and a set of storage units (SUs) 36 #1-#5. SUs #1-#5 include proposal records 90-1 through 90-5 for an encoded data slice and repair agents 88-1 through 88-5. FIG. 13 depicts an example of data access request errors resulting in abandoned contests. As discussed above, computing device A received proposal records indicating a threshold number of its desired version of the set of encoded data slices are visible and of priority. Therefore, computing device A sends a set of write finalize requests 104 to storage units (SUs) #1-#5. Because computing devices B and C did not receive proposal records indicating a threshold number of its desired version of the set of encoded data slices are visible and of priority, computing device B and C send cleanup requests 106 to the storage units to remove contest information from memory.

However, in the example shown, computing device B is temporarily offline (e.g., computing device B crashed, is not connected to the network, etc.) and was not able to send cleanup requests to the storage units. Also, in this example, SU #1 is offline for a period of time and did not receive a write finalize request 104 from computing device A or a cleanup request from computing device C. Additionally, computing device C sent cleanup requests 106, however due to a network error, the cleanup request to SU #2 is dropped. When such data access request errors occur, contest information in a proposal record can become abandoned and cause storage unit memory pressure. Memory pressure can lead to degraded performance or a process crash. To prevent this, storage units keep track of how many active contests it can have in memory to function properly and implement procedures to remove abandoned contests.

Figure 14:
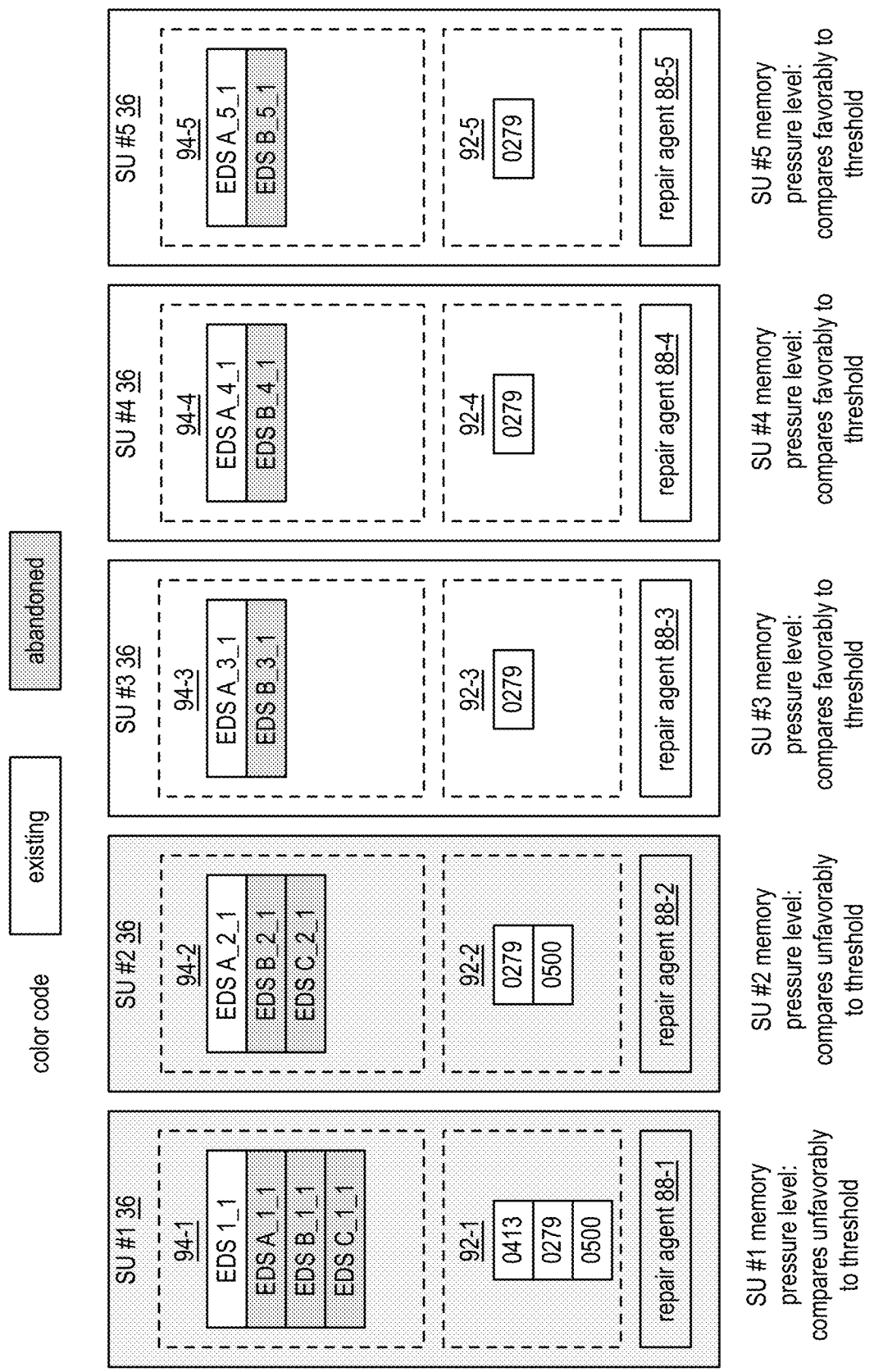
FIG. 14 is a schematic block diagram of a set of storage units in accordance with the present invention.

FIG. 14 is a schematic block diagram of a set of storage units 36 (SU#1-SU#5) of the DSN. As discussed with reference to FIG. 13, SU #1 was offline for a period of time and did not receive a write finalize request from computing device A or a cleanup request from computing device C and computing device B. Therefore, SU#1 stores a current revision level EDS 1_1 (i.e., SU #1 never received a write finalize request from computing device A) and also stores abandoned contest information from the write requests from computing devices A, B, and C (e.g., slice versions EDS A_1_1, EDS B_1_1, and EDS C_1_1 and transaction numbers 0413, 0279, and 0500).

Also, as discussed with reference to FIG. 13, computing device B was offline for a period of time and never sent cleanup requests to the storage units. Therefore, SUs #1-#5 store abandoned contest information from computing device B's losing write request (e.g., slice versions EDS B_1_1-B_5_1 and transaction number 0279). While computing device C sent cleanup requests to the storage units, the cleanup request sent to SU #2 was dropped due to a network error. Therefore, SU#2 also stores abandoned contest information from computing device C's losing write request (e.g., slice version EDS C_2_1 and transaction number 0500).

Each storage unit 36 (SU #1-SU #5) determines a storage unit memory pressure level based on the number of different versions of an encoded data slice of a set of encoded data slices currently stored in the proposal record of the encoded data slice and memory capacity of the storage unit. In this example, SU #1 and SU #2 determined a storage unit memory pressure level that compares unfavorably to a threshold (e.g., the storage units are storing too many active contests and are under pressure).

Figure 15:
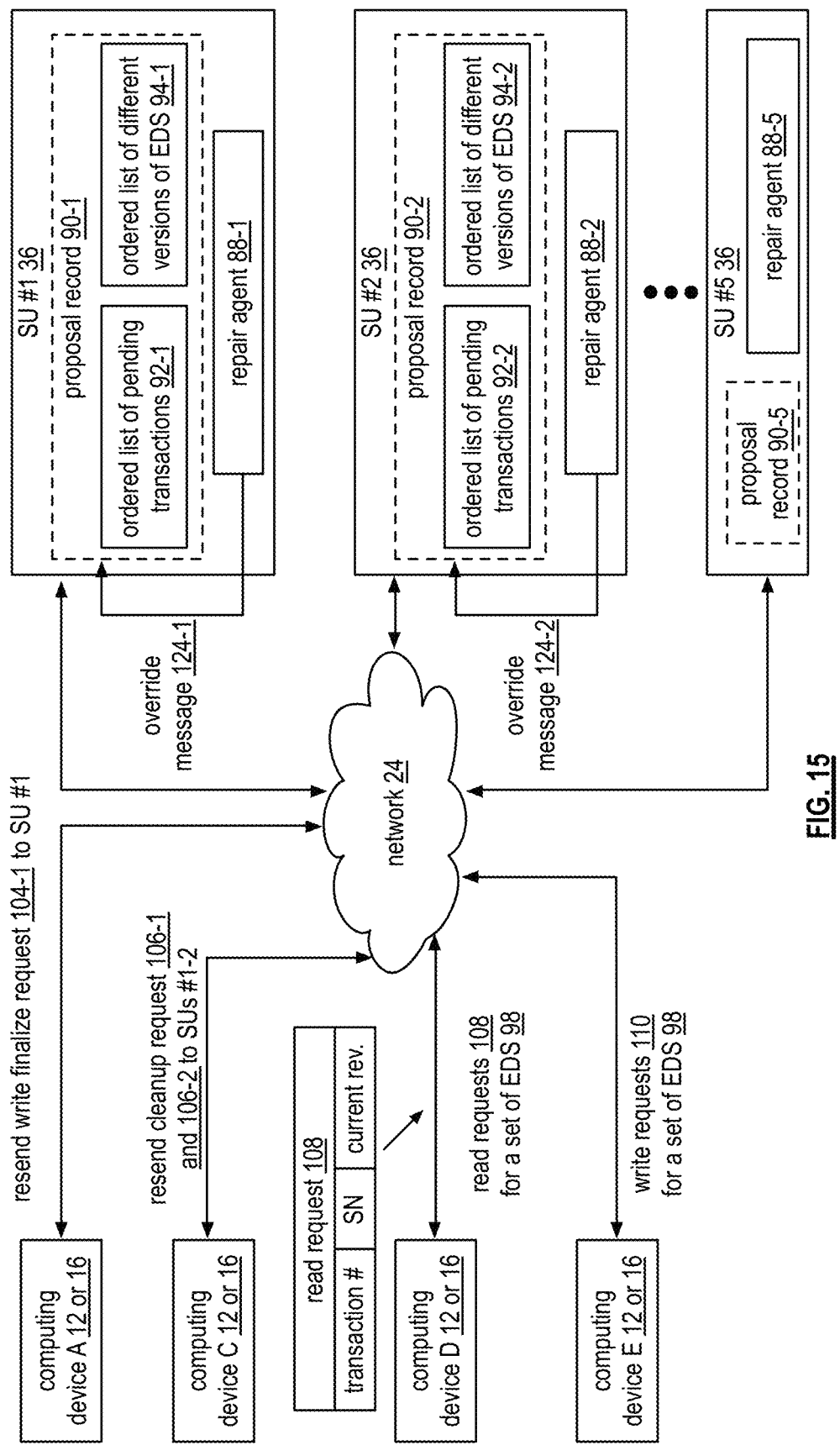
FIG. 15 is a schematic block diagram of another embodiment of the dispersed or distributed storage network (DSN) in accordance with the present invention.

FIG. 15 is a schematic block diagram of another embodiment of the dispersed or distributed storage network (DSN) that includes computing devices A-C (e.g., computing devices 12 or 16 of FIG. 1), network 24, and a set of storage units (SUs) 36 #1-#5. SUs #1-#5 include proposal records 90-1 through 90-5 for an encoded data slice and repair agents 88-1 through 88-5. FIG. 15 depicts an example of requests regarding a set of encoded data slices 98. As discussed in FIGS. 13-14, computing device B was offline temporarily, storage unit (SU) #1 was offline temporarily, and a cleanup message from computing device C to SU #2 was dropped. Because SU #1 was offline, SU #1 did not receive a write finalize request from computing device A. Here, computing device A resends a write finalize request 104-1 to SU #1 (e.g., when computing device A does not receive confirmation from SU #1). Computing device C resends cleanup requests 106-1 and 106-2 to SUs #1-2.

Computing device D is sending read requests 108 to the storage units 36 (SU#1-SU#5) for the set of encoded data slices 98 and computing device E is sending write requests 110 to the storage units 36 (SU#1-SU#5) for the set of encoded data slices 98. The read request 108 includes a transaction number field, a slice name (SN) field, and a current revision level field. Each read request in the set of read requests 108 includes the same transaction number, a different slice name, and the same current revision level.

SU #1 is receiving an override message 124-1 from repair agent 88-1 and SU #2 is receiving an override message 124-2 from repair agent 88-2. Because SUs #3-#5 are not under pressure (e.g., the memory pressure level discussed in FIG. 14 compares favorably to a threshold), SUs #3-#5 will continue to process these data access requests normally. However, because SUs #1-#2 are under pressure (e.g., the memory pressure level discussed in FIG. 14 compares unfavorably to a threshold), SUs #1-#2 determine whether the data access request is an override message 124. If so, the storage unit will process the override message 124. As an example, an override message is a cleanup message from the repair agent that includes an override forcing the storage unit to accept the message. When the storage unit is under pressure, the repair agent 88 adds an override to its messages so that the storage unit does not reject them or take time analyzing whether to accept them.

If the data access request does not include an override message 124, the storage unit generates a storage unit memory pressure level message in accordance with the storage unit memory pressure level and the type of data access request. The storage unit memory pressure level message may be an error code rejecting the data access request. Alternatively, the storage unit memory pressure level message may include an indication of how under pressure the storage unit is, an indication of how long the pressure is estimated, and instructions on how to proceed (e.g., wait a time period before trying again, slow down the rate of sending requests, etc.).

Figure 16:
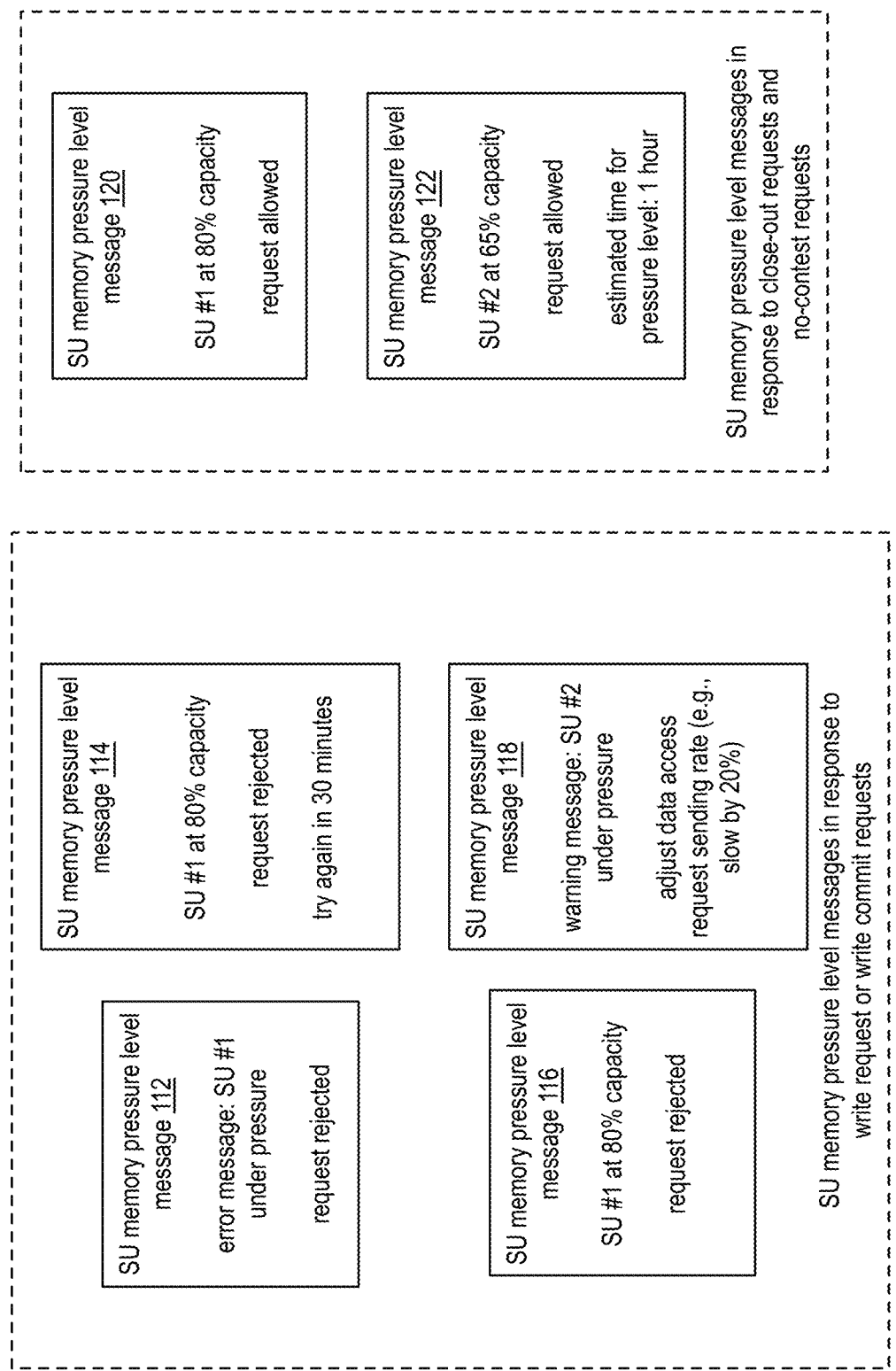
FIG. 16 is an example of storage unit memory pressure level messages in accordance with the present invention.

FIG. 16 is an example of storage unit memory pressure level messages. In this example, there are two categories of storage unit memory pressure level messages: 1) storage unit memory pressure level messages in response to write requests or write commit requests, and 2) storage unit memory pressure level messages in response to close-out messages and no-contest requests. When a storage unit determines that the data access request is not the override message, the storage unit generates a storage unit memory pressure level message in accordance with the storage unit memory pressure level and the type of data access request.

For example, when the type of data access request is a write request or write commit request for an encoded data slice of the set of encoded data slices 98 (e.g., a new contest), the storage unit determines a severity level of the storage unit memory pressure level. For example, SU #1 has a high severity level because it has three abandoned contests stored in memory. SU #2 has a medium severity level because it has two abandoned contests stored in memory. Based on the severity level, the storage unit memory pressure level message may include one or more of an error message, a warning message, a rejection of the data access request, an indication of the storage unit memory pressure level (e.g., percentage of memory capacity, etc.), a request to adjust data access request sending rate (e.g., a scale indicating to slow down the rate of future data access requests), a request to resend the data access request after a time period, and an estimated time period for the storage unit memory pressure level.

As specific examples of storage unit memory pressure level messages in response to write requests or write commit requests, storage unit ("SU") memory pressure level message 112 includes an error message indicating that SU #1 is currently under pressure and that the data access request is rejected. SU memory pressure level message 114 includes a message indicating that SU #1 is at 80% capacity, the data access request is rejected, and to try again in 30 minutes. SU memory pressure level message 116 includes a message indicating that SU #1 is at 80% capacity and that the data access request is rejected. SU memory pressure level message 118 includes a warning message indicating that SU #2 is under pressure and a request to adjust data access request sending rate (e.g., slow by 20%).

When the data access request is a close-out request or a no-contest request, the storage unit generates a memory pressure level message to indicate that the data access request is allowed and to include one or more of an indication of the storage unit memory pressure level (e.g., percentage of memory capacity, etc.) and an estimated time period for the storage unit memory pressure level. A close-out request includes one or more of a write finalize message and a cleanup message. A no-contest request includes one or more of a read request, a delete request, a list request, and an edit request. A no-contest request is a data access request that does not create an active contest and a close-out requests is a data access request that helps get rid of abandoned contests. Because these requests do not create active contests and can help clear up abandoned contests, a storage unit that is under pressure will allow them but will also notify the sender of the storage unit's state.

As specific examples of storage unit memory pressure level messages in response to close-out requests or a no-contest requests, storage unit ("SU") memory pressure level message 120 includes a message indicating that SU #1 is at 80% capacity and that the data access request is allowed. SU memory pressure level message 122 includes a message indicating that SU #2 is at 65% capacity, that the data access request is allowed, and that the estimated time for the pressure level is one hour.

Figure 17:
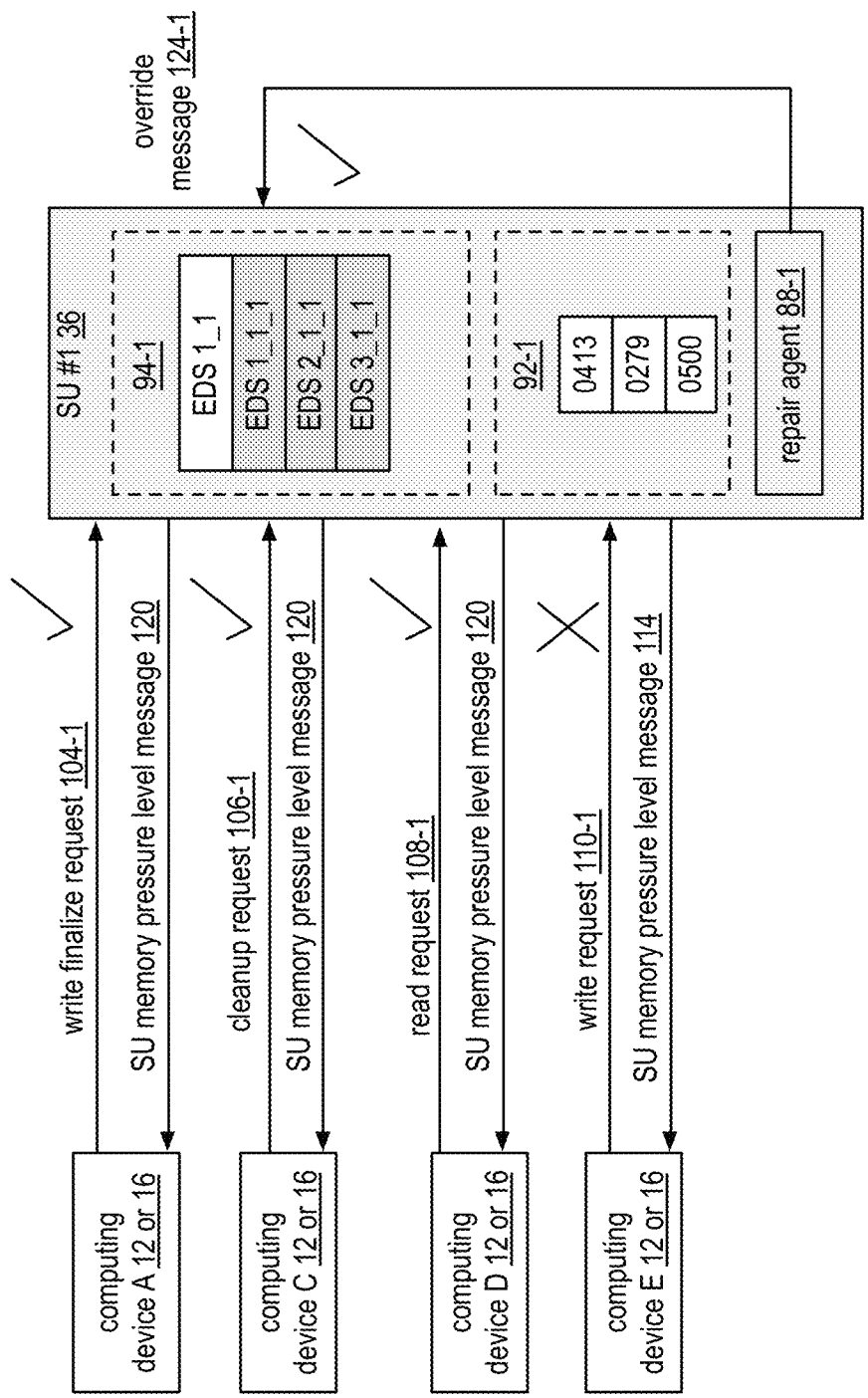
FIG. 17 is a schematic block diagram of an example of processing data access requests in accordance with a storage unit pressure level in accordance with the present invention.

FIG. 17 is a schematic block diagram of an example of processing data access requests in accordance with a storage unit pressure level. In this example, storage unit (SU) #1 36 is currently experiencing memory pressure as discussed in previous Figures. SU #1 has received a variety of data access requests regarding different versions of an encoded data slice. For example, SU #1 receives a write finalize request 104-1 from computing device A, a cleanup request 106-1 from computing device C, a read request 108-1 from computing device D, a write request from computing device E, and an override message from repair agent 88-1.

In response to the data access requests, SU #1 determines whether any are override messages 124. Here, SU #1 is receiving override message 124. Therefore SU #1 processes that message even though it is under pressure. As an example, the override message 124 may include instructions to remove abandoned contest information for EDS 2_1_1. As another example, override message may include instructions to finalize EDS 1_1_1 (e.g., if computing device A never resent the finalize message). For the data access requests that are not override messages, SU #1 generates a storage unit memory pressure level message in accordance with the storage unit memory pressure level and the type of data access request.

For example, in response to write request 110-1, SU #1 determines a severity level of the storage unit memory pressure level. In this example, SU #1 determines it has a high severity level because it has three abandoned contests stored in memory. SU #1 generates and sends SU memory pressure level message 114 that includes a message indicating that SU #1 is at 80% capacity, the data access request is rejected (e.g., the high severity level likely requires a rejection), and to try again in 30 minutes. SU #1 then processes write request 110-1 according to SU memory pressure level message 114 by rejecting the request.

In response to write finalize request 104-1, SU #1 generates and sends SU memory pressure level message 120 which includes a message indicating that SU #1 is at 80% capacity and that the data access request is allowed. SU #1 then processes write finalize request 104-1 according to SU memory pressure level message 120 to make EDS 1_1_1 the current revision.

In response to cleanup request 106-1, SU #1 also generates and sends SU memory pressure level message 120 which includes a message indicating that SU #1 is at 80% capacity and that the data access request is allowed. SU #1 then processes cleanup request 106-1 according to SU memory pressure level message 120 to remove EDS 3_1_1 contest information from memory.

In response to read request 108-1, SU #1 also generates and sends SU memory pressure level message 120 which includes a message indicating that SU #1 is at 80% capacity and that the data access request is allowed. SU #1 then processes read request 108-1 according to SU memory pressure level message 120 to read EDS 1_1_1.

Figure 18:
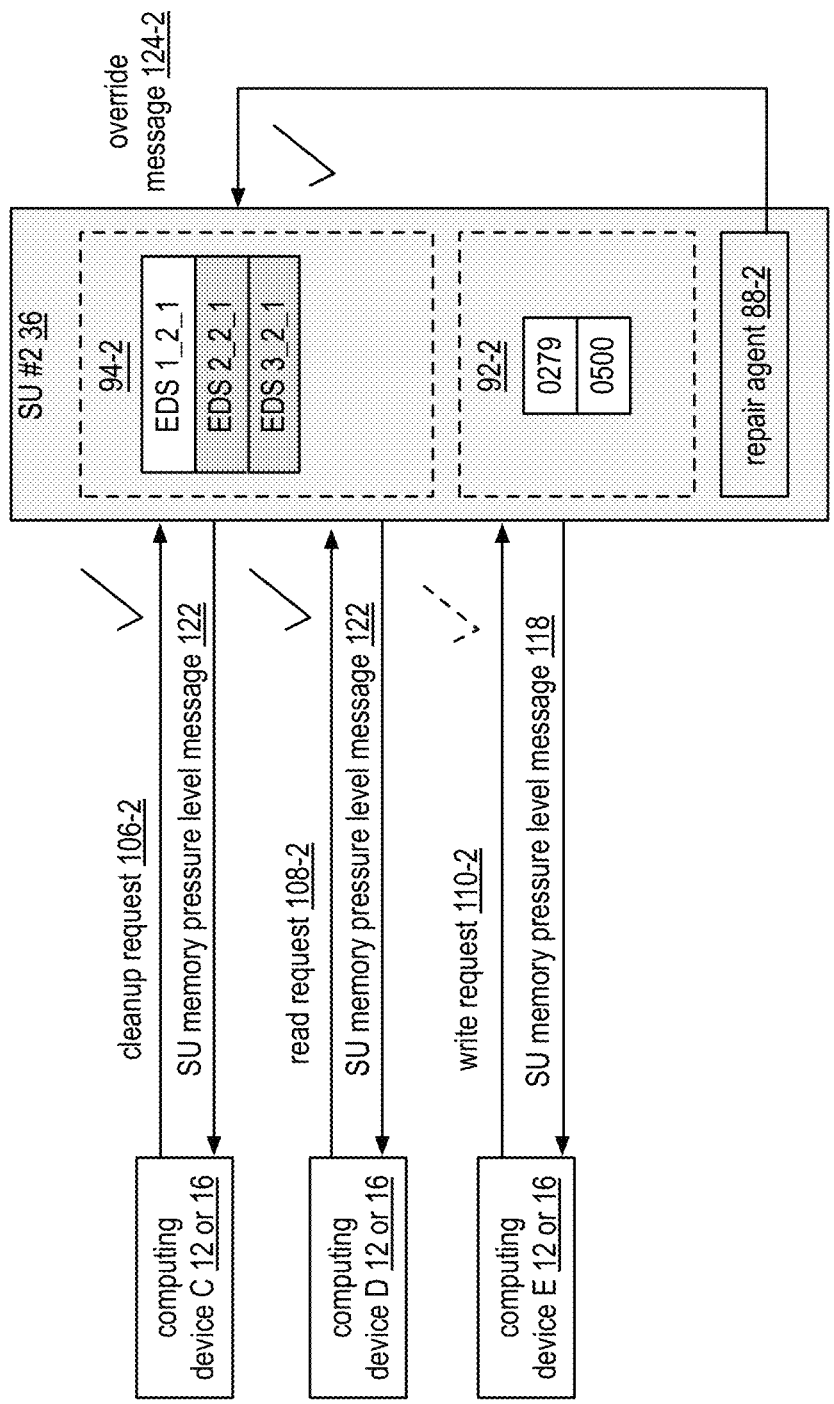
FIG. 18 is a schematic block diagram of another example of processing data access requests in accordance with a storage unit pressure level in accordance with the present invention.

FIG. 18 is a schematic block diagram of another example of processing data access requests in accordance with a storage unit pressure level. In this example, storage unit (SU) #2 36 is currently experiencing memory pressure as discussed in previous Figures. SU #2 has received a variety of data access requests regarding different versions of an encoded data slice. For example, SU #2 receives a cleanup request 106-2 from computing device C, a read request 108-2 from computing device D, a write request from computing device E, and an override message 124-2 from repair agent 88-2.

In response to the data access requests, SU #2 determines whether any are override messages 124. Here, SU #2 is receiving override message 124-2. SU #2 processes override message 124-2 normally even though it is under pressure. As an example, the override message 124-2 may include instructions to remove abandoned contest information for EDS 2_2_1. For the data access requests that are not override messages, SU #2 generates a storage unit memory pressure level message in accordance with the storage unit memory pressure level and the type of data access request.

For example, in response to write request 110-2, SU #2 determines a severity level of the SU memory pressure level. In this example, SU #2 determines that it has a medium severity level because it has two abandoned contests stored in memory. SU #2 generates and sends SU memory pressure level message 118 to computing device E which includes a warning message indicating that SU #2 is under pressure (e.g., a medium severity level does not require a data access request rejection in this example) and a request to adjust data access request sending rate (e.g., slow by 20%). SU #2 then processes write request 110-2 according to SU memory pressure level message 118 by processing the request.

In response to cleanup request 106-1, SU #2 generates and sends SU memory pressure level message 122 which includes a message indicating that SU #2 is at 65% capacity, that the data access request is allowed, and that the estimated time for the pressure level is one hour. SU #2 then processes cleanup request 106-2 according to SU memory pressure level message 122 to remove EDS 3_2_1 contest information from memory.

In response to read request 108-2, SU #2 also generates and sends SU memory pressure level message 122 which includes a message indicating that SU #2 is at 65% capacity, that the data access request is allowed, and that the estimated time for the pressure level is one hour. SU #2 then processes read request 108-2 according to SU memory pressure level message 120 to read EDS 1_2_1.

Figure 19:
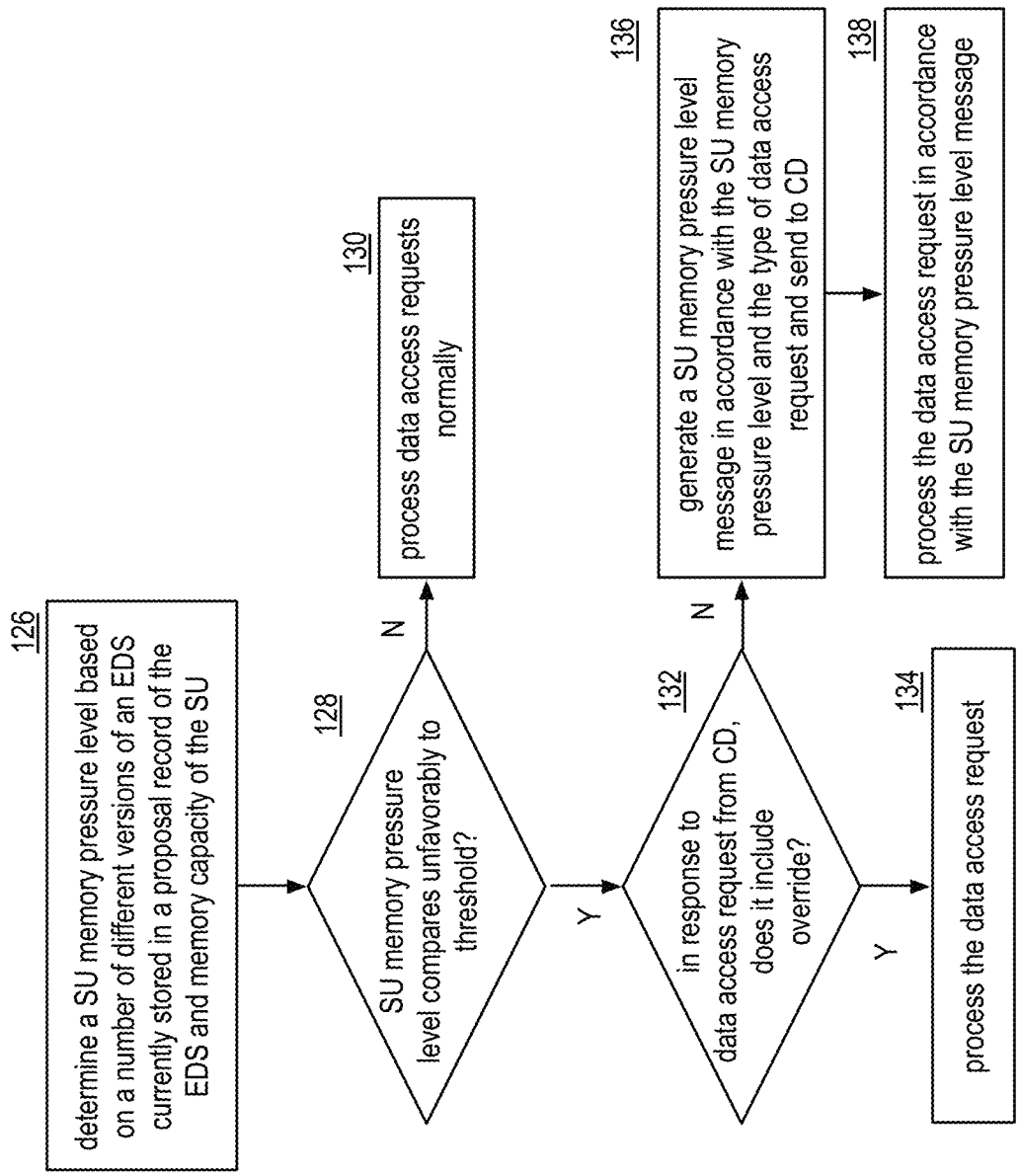
FIG. 19 is a logic diagram of an example of a method of processing data access requests in accordance with a storage unit memory pressure level in accordance with the present invention.

FIG. 19 is a logic diagram of an example of a method of processing data access requests in accordance with a storage unit memory pressure level. The method begins at step 126 where a storage unit of a dispersed storage network (DSN) determines a storage unit memory pressure level based on a number of different versions of an encoded data slice of a set of encoded data slices currently stored in a proposal record of the encoded data slice and memory capacity of the storage unit. The proposal record includes an ordered list of pending transactions for the encoded data slice and an ordered list of different versions of the encoded data slice.

An abandoned contest is a version of an encoded data slice that is left in memory after the end of the contest (e.g., a losing contest in an overlapping write request that is not cleaned up, etc.) or at the beginning of a new contest (e.g., a winning contest in an overlapping write request that is not finalized, etc.). There are many ways a contest may become abandoned on a storage unit. For example, a computing device that sent the data access request may crash, the storage unit may crash, a request can be dropped due to network contention, etc. Abandoned contests are held in the memory of the storage unit and, if active for a long time, may cause memory pressure. Memory pressure could lead to degraded performance or a process crash. Therefore, to prevent memory pressure, the storage units keep track of how many active contests are stored in memory and may reject new active contests until storage unit memory pressure is reduced (i.e., abandoned contests are removed).

The method continues with step 128 where the storage unit determines whether the storage unit memory pressure level compares unfavorably to a threshold. When the storage unit memory pressure level compares favorably to the threshold, the method continues with step 130 where the storage unit processes data access requests normally.

When the storage unit memory pressure level compares unfavorably to the threshold at step 128, the method continues with step 132 where in response to a data access request regarding the encoded data slice from a computing device ("CD") of the DSN, the storage unit determines whether the data access request includes an override message or a non-override message. For example, an override message is sent from a repair agent of the storage unit to cleanup abandoned contests. A repair agent removes erroneous or unnecessary data from a storage unit (e.g., is part of the storage unit or a separate device) and facilitates closing out and/or processing data access requests for the storage unit. The override forces the storage unit to accept messages from the repair agent. As an example, the override message may include instructions to finalize an abandoned contest involving the "winning" version of an encoded data slice from an overlapping write request. As another example, the override message may include instructions to cleanup an abandoned contest involving the "losing" version of an encoded data slice from an overlapping write request. When the data access request includes the override message, the method continues with step 134 where the storage unit processes the data access request.

When the data access request includes a non-override message, the method continues with step 136 where the storage unit generates a storage unit memory pressure level message in accordance with the storage unit memory pressure level and the type of data access request. When the type of data access request is a write request or write commit request for the encoded data slice, the storage unit determines a severity level of the storage unit memory pressure level. Based on the severity level, the storage unit memory pressure level message may include one or more of an error message, a warning message, a rejection of the data access request, an indication of the storage unit memory pressure level (e.g., percentage of memory capacity, etc.), a request to adjust data access request sending rate (e.g., a scale indicating to slow down the rate of future data access requests), a request to resend the data access request after a time period, and an estimated time period for the storage unit memory pressure level. As an example, when the severity level is high, the storage unit memory pressure level message may reject the data access request. When the severity level is medium, the storage unit memory pressure level message may accept the data access request but send a request to adjust data access request sending rate (e.g., slow down by 20%).

When the data access request is a close-out request or a no-contest request, the storage unit generates a memory pressure level message to indicate that the data access request is allowed and to include one or more of an indication of the storage unit memory pressure level (e.g., percentage of memory capacity, etc.) and an estimated time period for the storage unit memory pressure level. A close-out request includes one or more of a write finalize message and a cleanup message. A no-contest request includes one or more of a read request, a delete request, list request, and an edit request. A no-contest request is a data access request that does not create an active contest and a close-out requests is a data access request that helps get rid of abandoned contests. Because these requests do not create active contests and can help clear up abandoned contests, a storage unit that is under pressure will allow them but will also notify the computing device of the storage unit's state.

The storage unit sends the storage unit memory pressure level message to the computing device. The method continues with step 138 where the storage unit processes the data access request in accordance with storage unit memory pressure level message.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
   determining, by a storage unit of a dispersed storage network (DSN), a storage unit memory pressure level based on a number of different versions of an encoded data slice of a set of encoded data slices currently stored in a proposal record of the encoded data slice and memory capacity of the storage unit, wherein the proposal record includes an ordered list of pending transactions for the encoded data slice and an ordered list of different versions of the encoded data slice; and
   when the storage unit memory pressure level indicates that the storage units are storing more active contests than a threshold:
   in response to a data access request regarding the encoded data slice from a computing device of the DSN, determining whether the data access request includes an override message or a non-override message;
   when the data access request includes the non-override message:
   generating, by the storage unit, a storage unit memory pressure level message in accordance with the storage unit memory pressure level and a type of data access request;
   sending, by the storage unit, the storage unit memory pressure level message to the computing device; and
   processing, by the storage unit, the data access request in accordance with the storage unit memory pressure level message; and
   when the data access request includes the override message:
   processing, by the storage unit, the data access request.

2. The method of claim 1, wherein generating the storage unit memory pressure level message further comprises:
   when the data access request includes one or more of: one or more write requests and one or more write commit requests:
   determining, by the storage unit, a severity level of the storage unit memory pressure level; and
   generating, by the storage unit, the storage unit memory pressure level message based on the severity level to include one or more of:
   an error message;
   a warning message;
   a rejection of the data access request
   an indication of the storage unit memory pressure level;
   a request to adjust data access request sending rate;
   a request to resend the data access request after a time period; and
   an estimated time period for the storage unit memory pressure level.

3. The method of claim 1, wherein generating the storage unit memory pressure level message further comprises:
   when the data access request includes one or more of: one or more close-out requests and one or more no-contest requests;
   generating, by the storage unit, the storage unit memory pressure level message to indicate that the data access request is allowed and to include one or more of:
   an indication of the storage unit memory pressure level; and
   an estimated time period for the storage unit memory pressure level.

4. The method of claim 3, wherein the one or more close-out requests include:
   one or more write finalize requests; and
   one or more cleanup requests.

5. The method of claim 3, wherein the one or more no-contest requests include:
   one or more read requests;
   one or more delete requests;
   one or more list requests; and
   one or more edit requests.

6. The method of claim 1, wherein the data access request includes a slice name for the encoded data slice, a transaction number, a type of request, and a current revision level of the encoded data slice.

7. A storage unit of a dispersed storage network (DSN), the storage unit comprises:
   an interface;
   memory; and
   a processing module operably coupled to the memory and the interface, wherein the processing module is operable to:
   determine a storage unit memory pressure level based on a number of different versions of an encoded data slice of a set of encoded data slices currently stored in a proposal record of the encoded data slice and memory capacity of the storage unit, wherein the proposal record includes an ordered list of pending transactions for the encoded data slice and an ordered list of different versions of the encoded data slice; and
   when the storage unit memory pressure level indicates that the storage unit is storing more active contests than a threshold:
   in response to a data access request regarding the encoded data slice from a computing device of the DSN, determining whether the data access request includes an override message or a non-override message;
   when the data access request includes the non-override message:
   generating, by the storage unit, a storage unit memory pressure level message in accordance with the storage unit memory pressure level and a type of data access request;

sending, by the storage unit, the storage unit memory pressure level message to the computing device; and processing, by the storage unit, the data access request in accordance with the storage unit memory pressure level message; and when the data access request includes the override message:

processing, by the storage unit, the data access request.

8. The storage unit of claim 7, wherein the processing module is further operable to generate the storage unit memory pressure level message by:

when the data access request includes one or more of: one or more write requests and one or more write commit requests:

determining a severity level of the storage unit memory pressure level; and generating the storage unit memory pressure level message based on the severity level to include one or more of:

an error message;

a warning message;

a rejection of the data access request an indication of the storage unit memory pressure level;

a request to adjust data access request sending rate;

a request to resend the data access request after a time period; and an estimated time period for the storage unit memory pressure level.

9. The storage unit of claim 7, wherein the processing module is further operable to generate the storage unit memory pressure level message by:

when the data access request includes one or more of: one or more close-out requests and one or more no-contest requests;

generating the storage unit memory pressure level message to indicate that the data access request is allowed and to include one or more of:

an indication of the storage unit memory pressure level; and an estimated time period for the storage unit memory pressure level.

10. The storage unit of claim 9, wherein the one or more close-out requests include:

one or more write finalize requests; and one or more cleanup requests.

11. The storage unit of claim 9, wherein the one or more no-contest requests include:

one or more read requests;

one or more delete requests;

one or more list requests; and one or more edit requests.

12. The storage unit of claim 7, wherein the data access request includes a slice name for the encoded data slice, a transaction number, a type of request, and a current revision level of the encoded data slice.

* * * * *